FULL WAVE PHASE DETECTOR WITH SYNCHRONOUSLY CONTROLLED ELECTRONIC SWITCHES

Filed June 28, 1963 2 Sheets-Sheet 1

INVENTOR.
DONUIL A. HILLIS,
BY Paul M. Coble
ATTORNEY.

INVENTOR.
DONUIL A. HILLIS,
BY Paul M. Coble
ATTORNEY.

United States Patent Office 3,212,013
Patented Oct. 12, 1965

3,212,013

FULL WAVE PHASE DETECTOR WITH SYNCHRONOUSLY CONTROLLED ELECTRONIC SWITCHES

Donuil A. Hillis, Palos Verdes, Calif., assignor to Hughes Aircraft Company, Culver City, Calif., a corporation of Delaware Filed June 28, 1963, Ser. No. 291,474
6 Claims. (Cl. 328—133)

This invention relates to the detection of phase modulated signals, and more particularly relates to a transistorized full wave phase detector which is operable over a wide range of frequencies and temperatures with a high degree of accuracy.

Conventional full wave phase detectors have required the use of an input transformer, posing inherent limitations in the bandwidth and temperature ranges over which the detectors can operate with a reasonable degree of accuracy. Half wave phase detectors have been built which are simple, accurate, and which do not require an input transformer. However, where high accuracy is desired, these detectors require a keying circuit to supply a square wave driving signal which is critically symmetrical as a function of time, and in addition, little or no bias error can be tolerated.

Accordingly, it is an object of the present invention to provide a simple and reliable synchronous phase detector which is capable of operating over wide ranges of frequencies and temperatures with a high degree of accuracy.

It is a further object of the present invention to provide a phase sensitive detector circuit in which the keying signal used to drive the detector is not as critical as in prior art circuits, and in which the detector may be driven from a source having a greater D.C. bias error tolerance than in the past.

It is a still further object of the present invention to provide a transistorized synchronous full wave phase detector which does not require the use of an input signal transformer.

In accordance with the foregoing objects the circuit of the present invention provides an output signal the magnitude of which is determined by the phase difference between an input signal and a reference signal. A low pass filter develops a signal representative of the average value of the signal applied to the filter. Electronic switches, preferably controllable impedance semiconductor devices, operate under the control of keying signals to apply the input signal to the low pass filter during one half cycle of the reference signal and to apply an inverted form of the input signal to the low pass filter during the other half of the reference signal cycle.

Figure 1:
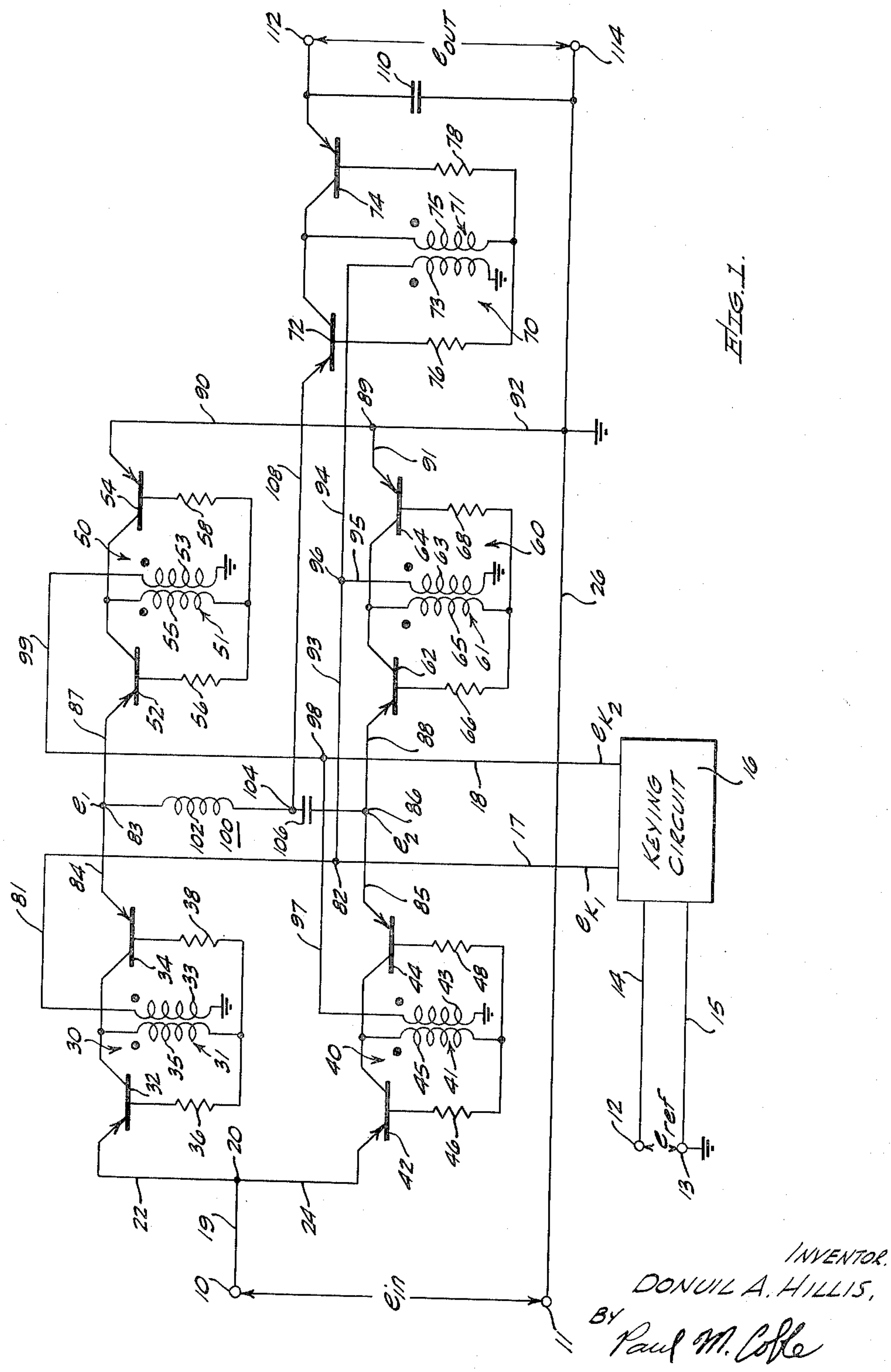
Figure 2:
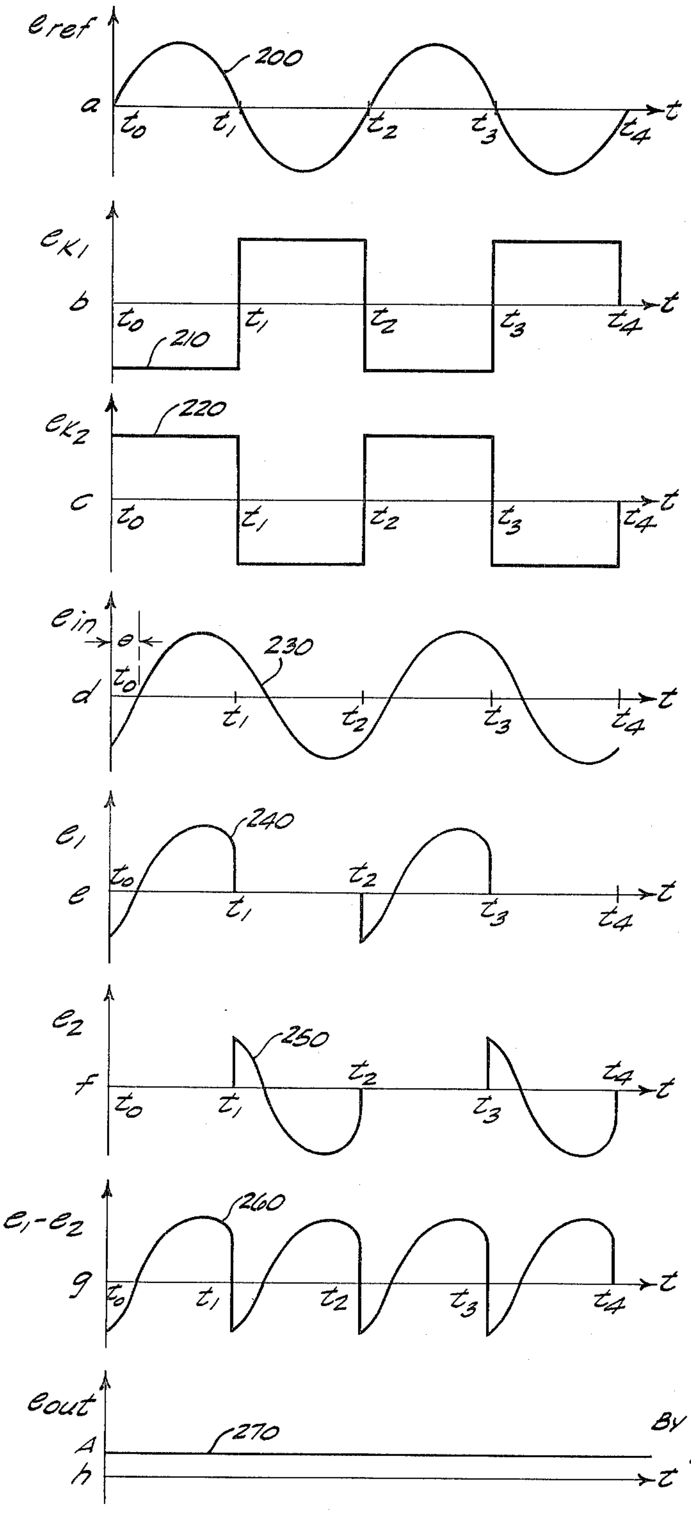

Other and further objects, advantages, and characteristic features of the present invention will be readily apparent from a consideration of the following detailed description of a preferred embodiment of the invention when taken in conjunction with the accompanying drawings in which:

FIG. 1 is a schematic circuit diagram, partially in block form, of a phase detector provided in accordance with the principles of the present invention; and FIGS. 2(*a*)–(*h*) are graphs illustrating voltage waveforms as a function of time at various points in the circuit of FIG. 1.

Referring now to FIG. 1 of the drawings with more particularity, the phase detector of the present invention may be seen to include a pair of input terminals 10 and 11 adapted to receive an input voltage $e_{in}$ whose phase is to be compared with the phase of a reference voltage $e_{ref}$ applied to the detector between a second pair of terminals 12 and 13. The voltage $e_{in}$ may be, for example, a phase modulated carrier signal, while the reference voltage $e_{ref}$ may be a sine wave at the carrier frequency.

The voltage $e_{ref}$ at the terminals 12 and 13 is applied via respective leads 14 and 15 to a keying circuit 16, which may be a conventional Schmitt trigger circuit, for example. The circuit 16 functions to convert the reference sine wave into a pair of square wave signals 180° out of phase from one another and apply these two square wave signals, designated as $e_{k1}$ and $e_{k2}$, between a lead 17 and ground and between a lead 18 and ground, respectively. The waveforms on the leads 17 and 18 are keying signals which control the state of transistor switches in the detector circuit in the manner to be described below.

The input terminal 10 of the detector circuit is connected via a lead 19 to a junction point 20 to which is connected a pair of leads 22 and 24. The other input terminal 11 of the detector is connected through a lead 26 to ground.

The phase detector of the invention comprises five identical electronic switching networks designated generally by the reference numerals 30, 40, 50, 60 and 70. Each of these switching networks is a controllable impedance device in the form of a two-transistor arrangement in which the transistors are connected in back-to-back fashion with interconnected collectors. The conductive condition of the transistors is controlled by a keying signal applied between the collector and base electrodes of the transistors.

More specifically, in the switching network 30 a pair of PNP transistors 32 and 34 have their collector electrodes directly connected together and have their base electrodes interconnected through series resistors 36 and 38. It should be understood, of course, that PNP transistors are shown solely for illustrative purposes, and NPN transistors may alternatively be employed. A pulse transformer 31, having a primary winding 33 connected between a lead 81 and ground, has its secondary winding 35 connected between the common collectors of the transistors 32 and 34 and the junction between the base resistors 36 and 38. The keying signal $e_{k1}$, which controls the conductive states of the transistors 32 and 34, is applied across the collector-base of these transistors by means of the pulse transformer 31 with a polarity indicated in the conventional manner by the dots adjacent the transformer windings 33 and 35. The keying signal $e_{k1}$ is fed to the primary winding 33 via the lead 81 which is connected to the first keying signal lead 17 at a junction point 82. The emitter of the transistor 32 is connected to the lead 22, while the emitter of the transistor 34 is connected to a junction point 83 via a lead 84.

Each of the switches 40, 50, 60 and 70 is identical to the switch 30, with the component circuit elements comprising these four switching networks being designated by reference numerals in which the first digit is the same as that used to generally designate the switch in question and the second digit is the same as that for the counterpart circuit element in the switch 30.

In the interconnection of the switching networks 40, 50, 60 and 70 with the remainder of the detector circuit, the emitter of the transistor 42 is connected to the lead 24, while the emitter of the transistor 44 is connected via a lead 85 to a junctoin point 86. The emitters of the transistors 52 and 62 are connected via respective leads 87 and 88 to the junction points 83 and 86, respectively. A junction point 89 is connected to the emitters of transistors 54 and 64 via respective leads 90 and 91 and is also connected to ground by means of a lead 92.

The keying signal $e_{k_1}$ is applied to the transformer primary winding 73 for the switch 70 through leads 93 and 94 connected in series between the junction point 82 and the windnig 73, and this keying signal is also applied to the transformer winding 63 of the switch 60 by means of a lead 95 connected between the winding 63 and a junction 96 between the leads 93 and 94. The keying signal $e_{k_2}$ is applied to the switch 40 by means of a lead 97 connected between the primary winding 43 of the transformer 41 and a junction point 98 connected to the second keying signal lead 18. The keying signal $e_{k_2}$ is also applied to the switch 50 over a lead 99 connected between the junction point 98 and the primary winding 53 of the transformer 51.

A low pass filter network 100 is connected between the junction points 83 and 86. The filter 100 includes an inductance coil 102 connected between the junction point 83 and a junction point 104, and a capacitor 106 connected between the junctions 104 and 86. The junction point 104 is connected via a lead 108 to the emitter of the transistor 72.

A capacitor 110, across which the detected output signal $e_{out}$ is developed, is connected between the emitter of the transistor 74 and ground. The voltage $e_{out}$ may be taken from a pair of output terminals 112 and 114 connected respectively to the emitter of the transistor 74 and to ground.

In the operation of the detector of the present invention, now to be described with reference to the waveforms illustrated in FIG. 2, the reference voltage $e_{ref}$, depicted by the sine wave 200 of FIG. 2(*a*), is applied via terminals 12 and 13 to the keying circuit 16. The keying circuit 16 develops from the sine wave 200 a first keying voltage $e_{k_1}$, illustrated by the square wave 210 of FIG. 2(*b*), and a second keying voltage $e_{k_2}$, shown by the square wave 220 of FIG. 2(*c*), the voltage 220 being 180° out of phase with respect to the voltage 210. The waveform 210 is applied to the lead 17, while the waveform 220 is fed to the lead 18. The input voltage $e_{in}$, the phase of which is to be compared with that of the reference voltage $e_{ref}$, is shown by the waveform 230 of FIG. 2(*d*), and it may be seen that in the illustrated exemplary case the input waveform 230 lags the reference signal 200 by an angle $\theta$.

During the first half cycle of the reference waveform 200, i.e., during the time interval $t_0$–$t_1$, the keying signal 210 which is applied to the switches 30, 60 and 70 is negative, while the keying voltage 220 applied to the switches 40 and 50 is positive. When the keying voltage applied to the pair of transistors in any of the switches 30, 40, 50, 60 and 70 is at its positive level, the transistors to which this positive voltage is applied are maintained in essentially a cutoff condition, thereby providing a high impedance in their emitter-collector paths. On the other hand, when the keying voltage resides at its negative level the transistors to which this voltage is applied are biased into a state of heavy conduction, thereby providing a low impedance in their emitter-collector paths. Thus, during the time interval $t_0$–$t_1$ the transistors 32, 34, 62, 64, 72 and 74 are rendered conductive by the negative keying voltage $e_{k_1}$, while the transistors 42, 44, 52 and 54 are cut off by the positive keying voltage $e_{k_2}$. The switches 30, 60 and 70 are thus placed in a "closed" condition, i.e., a low impedance path is provided through the switch 30 between the leads 22 and 84, through the switch 60 between the leads 88 and 91, and through the switch 70 between the lead 108 and the terminal 112; while the switches 40 and 50 are maintained in an "open" state, i.e., a high impedance path is provided through the switch 40 between the leads 24 and 85 and through the switch 50 between the leads 87 and 90. Accordingly, during the first cycle of the reference voltage, the first terminal 83 of the low pass filter 100 is connected via a low impedance path to the input terminal 10, while the second terminal 86 of the filter 100 is connected by a means of a low impedance path to the input terminal 11. The voltage $e_1$ at the terminal 83 is illustrated by the waveform 240 of FIG. 2(*e*), and it may be seen that during the time interval $t_0$–$t_1$, the input voltage $e_{in}$ is applied across the coil 102 and the capacitor 106 of the filter 100.

During the next half cycle of the reference waveform 200, i.e., during the time interval $t_1$–$t_2$, the keying signal 210 is positive while the keying waveform 220 resides at its negative level. This condition places the switches 30, 60 and 70 in an open condition, while closing the switch 40 and 50. A low impedance path is thereby provided through the switch 40 between the input terminal 10 and the terminal 86 of the filter 100, and through the switch 50 between the input terminal 11 and the terminal 83 of the filter 100. The voltage $e_2$ at the terminal 86 of the filter 100 is illustrated by the waveform 250 of FIG. 2(*f*), and it may be seen that during the time interval $t_1$–$t_2$ the input waveform 230 is applied across the filter 100 in inverted form, i.e., the waveform is applied between the terminals 86 and 83 rather than between the terminals 83 and 86.

The instantaneous voltage across the filter 100, i.e., the voltage $e_1$–$e_2$, is illustrated by the waveform 260 of FIG. 2(*g*). The capacitor 106 develops a charge corresponding to the average value of the instantaneous filter voltage $e_1$–$e_2$, and this averaged voltage is transferred by means of the switch 70 to the capacitor 110 during each first half cycle of the reference waveform 200 to provide the output voltage $e_{out}$.

During the ensuing half cycle $t_2$–$t_3$ of the reference signal, operation is identical to that described above for the time interval $t_0$–$t_1$; while operation during the time interval $t_3$–$t_4$ is the same as that for the time period $t_1$–$t_2$.

It may be seen from FIG. 2(*g*) that as the phase difference $\theta$ between the reference waveform 200 and the input voltage 230 changes, the positive and negative portions of the waveform 260 are altered accordingly, thereby varying the average value of the waveform 260. For the particular case illustrated the average value of waveform 260 is at a level A, providing a D.C. voltage 270 of magnitude A, FIG. 2(*h*), across the capacitor 110. It may be observed that if the phase difference $\theta$ were zero, the waveform 260 would be simply a full wave rectified version of the input signal 230. For this case the average value of the waveform 260 would be at a maximum positive value equal to .636 of the peak value of the waveform 260. For a phase lag $\theta$ of 90° the positive and negative portions of the waveform 260 would be equal, thereby providing an average value of zero. For a sinusoidal input $e_{in}$ the output voltage $e_{out}$ provided across the capacitor 110 is given by $e_{out}=.636\ E \cos \theta$ where E is the peak value of the input voltage $e_{in}$. Thus, the magnitude of the output voltage varies as a sinusoidal function of the phase difference $\theta$ between the reference voltage and the input voltage, providing phase detection of the input voltage.

The circuit of the present invention provides very accurate full wave phase detection over a wide range of frequencies and temperatures. In addition, the keying signal used to drive the detector is not as critical as in the prior art because the averaging effect over the entire reference signal cycle minimizes any asymmetrical aspect of the keying signals. Moreover, since bias errors have equal and opposite effects during alternate half cycles, resulting in their cancellation, a relatively large D.C. bias error may be tolerated without detrimentally affecting performance of the circuit.

Although the present invention has been shown and described with reference to a particular embodiment, nevertheless various changes and modifications obvious to one skilled in the art to which the invention pertains are deemed to be within the purview of the invention.

I claim:

1. A phase detector comprising: first and second input terminals for receiving an input signal; first and second output terminals for providing an output signal, said second output terminal being coupled to said second input terminal; a low pass filter having first, second and third terminals; first electronic switch means coupled between said first input terminal and said first terminal of said filter; second electronic switch means coupled between said second input terminal and said second terminal of said filter; third electronic switch means coupled between said first input terminal and said second terminal of said filter; fourth electronic switch means coupled between said second input terminal and said first terminal of said filter; fifth electronic switch means coupled between said third terminal of said filter and said first output terminal; means for closing said first, second and fifth and opening said third and fourth switch means during a first portion of a reference signal cycle and for closing said third and fourth switch means and opening said first, second and fifth switch means during a second portion of said reference signal cycle; and capacitive means coupled between said first and second output terminals.

2. A phase detector comprising: first and second input terminals for receiving an input signal; first and second output terminals for providing an output signal, said second output terminal being coupled to said second input terminal; a low pass filter having first, second and third terminals; first, second, third, fourth and fifth controllable impedance semiconductor devices each having a current path with a low impedance state and a high impedance state; the current path of said first semiconductor device being coupled between said first input terminal and said first terminal of said filter; the current path of said second semiconductor device being coupled between said second input terminal and said second terminal of said filter; the current path of said third semiconductor device being coupled between said first input terminal and said second terminal of said filter; the current path of said fourth semiconductor device being coupled between said second input terminal and said first terminal of said filter; the current path of said fifth semiconductor device being coupled between said third terminal of said filter and said first output terminal; means for controlling said first, second, third, fourth and fifth semiconductor devices to establish a low impedance in the current paths of said first, second and fifth semiconductor devices and a high impedance in the current paths of said third and fourth semiconductor devices during a first portion of a reference signal cycle and to establish a high impedance in the current paths of said first, second and fifth semiconductor devices and a low impedance in the current paths of said third and fourth semiconductor devices during a second portion of said reference signal cycle, and capacitive means coupled between said first and second output terminals.

3. A full wave phase detector circuit for providing an output signal the magnitude of which is determined by the phase difference between an input signal and a reference signal comprising: first and second input terminals for receiving said input signal; first and second output terminals for providing said output signal, said second output terminal being coupled to said second input terminal; a low pass filter having first, second and third terminals; keying circuit means for developing from said reference signal first and second square wave keying signals 180° out of phase from one another; first electronic switch means coupled between said first input terminal and said first terminal of said filter; second electronic switch means coupled between said second input terminal and said second terminal of said filter; third electronic switch means coupled between said first input terminal and said second terminal of said filter; fourth electronic switch means coupled between said second input terminal and said first terminal of said filter; fifth electronic switch means coupled between said third terminal of said filter and said first output terminal; means for applying said first keying signal to said first, second and fifth switch means to close said first, second and fifth switch means during one half cycle of said first keying signal and to open said first, second and fifth switch means during the other half cycle of said first keying signal; means for applying said second keying signal to said third and fourth switch means to open said third and fourth switch means during said one half cycle of said first keying signal and to close said third and fourth switch means during said other half cycle of said first keying signal, and capacitive means coupled between said first and second output terminals.

4. A full wave phase detector circuit for providing an output signal the magnitude of which is determined by the phase difference between an input signal and a reference signal comprising: first and second input terminals for receiving said input signal; first and second output terminals for providing said output signal, said second output terminal being coupled to said second input terminal; a low pass filter having first, second and third terminals; keying circuit means for developing from said reference signal first and second square wave keying signals 180° out of phase from one another; first, second, third, fourth and fifth controllable impedance semiconductor arrangements each having a current path with a low impedance state and a high impedance state; the current path of said first semiconductor arrangement being coupled between said first input terminal and said first terminal of said filter; the current path of said second semiconductor arrangement being coupled between said second input terminal and said second terminal of said filter; the current path of said third semiconductor arrangement being coupled between said first input terminal and said second terminal of said filter; the current path of said fourth semiconductor arrrangement being coupled between said second input terminal and said first terminal of said filter; the current path of said fifth semiconductor arrangement being coupled between said third terminal of said filter and said first output terminal; means for applying said first keying signal to said first, second and fifth semiconductor arrangements to establish in the current paths thereof a low impedance during one half cycle of said first keying signal and a high impedance during the other half cycle of said first keying signal; means for applying said second keying signal to said third and fourth semiconductor arrangements to establish in the current paths thereof a high impedance during said one half cycle of said first keying signal and a low impedance during said other half cycle of said first keying signal, and capacitive means coupled between said first and second output terminals.

5. A circuit according to claim 4 wherein each of said controllable impedance semiconductor arrangements comprises first and second transistors having their collector electrodes connected together; first and second resistors connected in series between the base electrodes of said first and second transistors; a transformer having a primary winding and a secondary winding; said secondary winding being connected between the common collector electrodes of said first and second transistors and the junction between said first and second resistors; the primary winding in said first, second and fifth arrangements being connected to said first keying signal applying means; and the primary winding in said third and fourth arrangements being connected to said second keying signal applying means.

6. A circuit according to claim 4 wherein said low pass filter includes an inductor connected between said first and third terminals of said filter and a capacitor connected between said second and third terminals of said filter.

References Cited by the Examiner

UNITED STATES PATENTS

| | | | |
|---|---|---|---|
| 2,937,342 | 5/60 | Wellman | 329—103 |
| 2,942,124 | 6/60 | Kistler | 307—88.5 |

| | | | |
|---|---|---|---|
| 3,121,843 | 2/64 | Ule | 307—88.5 |

OTHER REFERENCES

Caldecott: "A Compensated Square Wave Phase Discriminator," Electronic Engineering, September 1954, page 401 relied on.

Johanson: "Demodulator-Limiter for Control System Signals," Electronics, Sept. 1, 1957, page 155 relied on.

ARTHUR GAUSS, *Primary Examiner.*